United States Patent [19]

Ogura

[11] Patent Number: 5,285,133
[45] Date of Patent: Feb. 8, 1994

[54] DEFLECTION CURRENT GENERATING CIRCUITS

[75] Inventor: Toshiyuki Ogura, Tokyo, Japan
[73] Assignee: Sony Corporation, Tokyo, Japan
[21] Appl. No.: 939,797
[22] Filed: Sep. 3, 1992
[30] Foreign Application Priority Data Sep. 6, 1991 [JP] Japan .................................. 3-254490

[51] Int. Cl.⁵ .......................... G09G 1/04; H01J 29/70
[52] U.S. Cl. ..................................... 315/371; 315/408
[58] Field of Search ............... 315/408, 370, 371, 393, 315/395

[56] References Cited

U.S. PATENT DOCUMENTS

| | | | |
|---|---|---|---|
| 4,169,988 | 10/1979 | Fecht | 315/371 |
| 4,206,388 | 6/1980 | Ishigaki et al. | 315/371 |
| 4,242,714 | 12/1980 | Yoshida | 315/371 |
| 4,625,155 | 11/1986 | Dietz | 315/408 |
| 4,906,902 | 3/1990 | Haferl | 315/371 |

FOREIGN PATENT DOCUMENTS 0195392  3/1986  European Pat. Off. .
0332091  3/1989  European Pat. Off. .
3234314  9/1982  Fed. Rep. of Germany .

OTHER PUBLICATIONS

JP2166970–Patent Abstracts of Japan; vol. 900, No. 917; Hitachi Ltd, et al.; European Patent Office.
JP60024779–Patent Abstracts of Japan; vol. 850, No. 618; Nippon Victor KK; European Patent Office.

Primary Examiner—Gregory C. Issing
Attorney, Agent, or Firm—Jerry A. Miller

[57] ABSTRACT

A deflection current circuit having reduced power requirements. A switch 33 is controlled by a control circuit 71 in association with the horizontal deflection period. A switch 73 is controlled by the control circuit 72 in synchronization with the horizontal deflection period modulated by the vertical deflection period. Switch 33 is turned off in the retrace interval, and during the period in which the switch 33 is in the off-state, the switch 73 is turned off for a predetermined period. The off-period of the switch 73 is modulated by the vertical deflection period to produce greater horizontal deflection in the center of the screen.

4 Claims, 14 Drawing Sheets

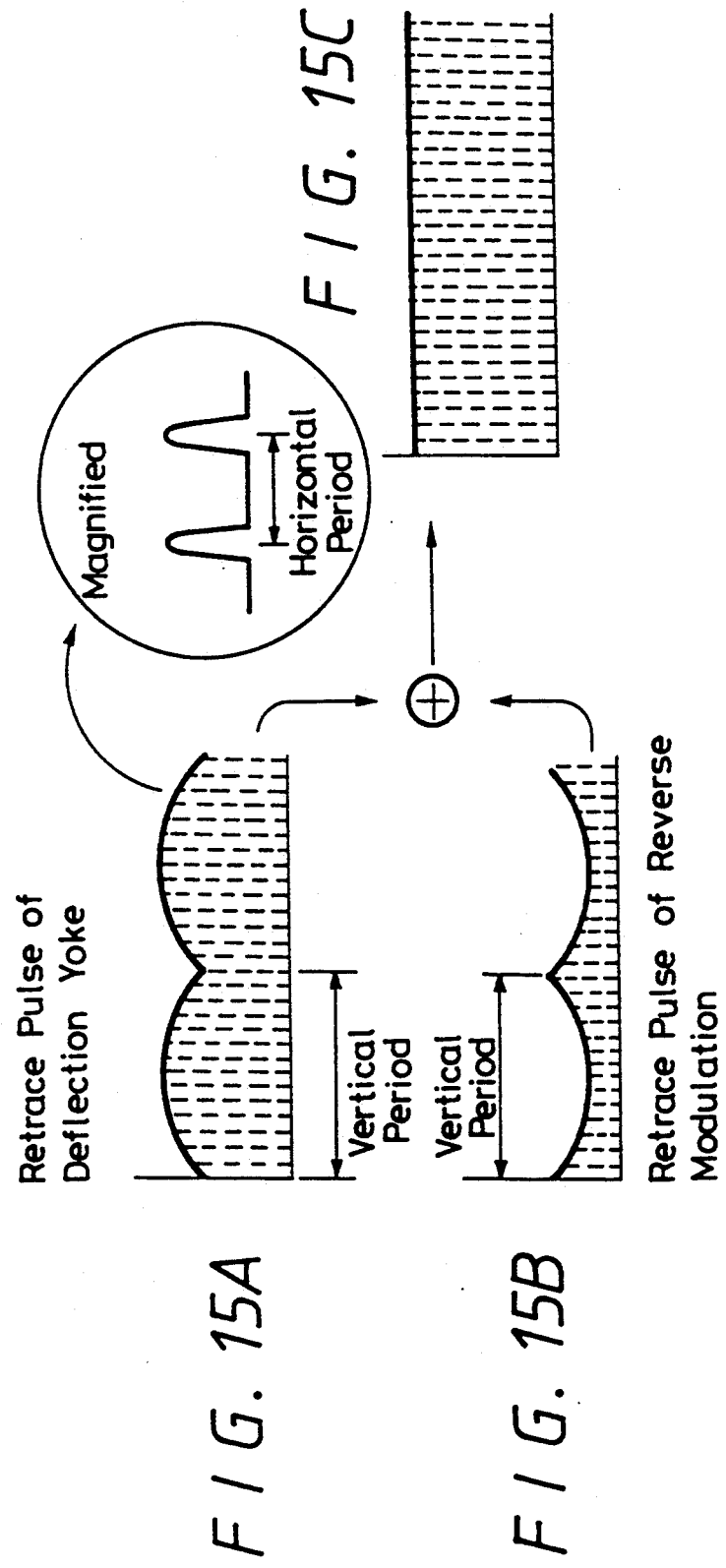

DEFLECTION CURRENT GENERATING CIRCUITS

BACKGROUND

1. Field of the Invention

This invention relates generally to the field of deflection current generating circuits suitable for use in, for example, a television receiver or a video monitor. More particularly, this invention relates to a television deflection circuit having horizontal pin distortion compensation and reduced power consumption.

2. Background of the Invention

A conventional arrangement of a horizontal deflection circuit and neighboring circuits of a television receiver are shown in FIG. 10. A horizontal deflection circuit 1 is connected with a power supply 3 through a primary coil 2a of a flyback transformer 2. A secondary winding 2b of the transformer 2 is connected to a rectifying/smoothing circuit which is formed of a diode 4 and a capacitor 5. A horizontal deflection current from the horizontal deflection circuit 1 is supplied to a deflection yoke 7 of a CRT 6 having a screen 6a.

FIG. 11 shows the circuit arrangement of the horizontal deflection circuit 1. This horizontal deflection circuit 1 has a parallel circuit of an NPN transistor 22, a diode 23, and a capacitor 24 all in parallel with the series combination of deflection yoke 7 and capacitor 25. The transformer 2 also has a secondary winding 2c, the output of which is rectified by a diode 21.

The operation of this arrangement will be described below. The DC voltage from the power supply 3 is supplied through the primary coil 2a of the transformer 2 to the collector of the NPN transistor 22. This NPN transistor 22 is turned on and off when a signal having a period corresponding to the horizontal deflection period is supplied to its base. The result is that the NPN transistor 22 produces, at its collector, a flyback pulse (retrace pulse) Vcp as shown in FIG. 12(b).

The capacitors 24 and 25 and the deflection yoke 7 make up a resonant circuit, which is resonant at the switching frequency of the NPN transistor 22. Thus, in the deflection yoke 7 a deflection current $I_7$ of a so-called saw-tooth wave flows. As shown in FIG. 12(a), this wave linearly increases during the trace interval and linearly decreases during the retrace interval. The electron beam scans (or is deflected) in the horizontal direction on the screen 6a of the CRT 6 under control of this deflection current.

The flyback pulse voltage Vcp is boosted by the secondary coil 2c of the flyback transformer 2, and rectified by the diode 21 so that a high voltage Hv is generated at the cathode of the diode. This high voltage Hv is supplied to the anode of the CRT 6. The voltage induced in the secondary coil 2b is rectified by diode 4 and smoothed by capacitor 5 into a DC voltage Vc. This voltage vc is used for the focus voltage and heater voltage of the CRT 6 and so on.

As shown in FIG. 12(b), the distance from an electron gun 6b to the screen 6a is the shortest at the center of the screen 6a, longer at the top and bottom of the screen 6a, and the longest at the corners of the screen 6a. Consequently, a so-called horizontal pin is generated as illustrated in FIG. 13(a). If this horizontal pin is left as it is, the displayed image appears distorted. Thus, usually a circuit is added to the horizontal deflection circuit for correcting this horizontal pin distortion.

FIG. 14 shows the principle of a horizontal deflection circuit which is disclosed in Japanese Patent Publication Gazette No. 57-39102. In this example, a DC voltage from a power supply 31 is supplied through a coil 32 to a parallel circuit of a switch 33, the capacitor 24 and a series circuit of the horizontal deflection coil 7 and the capacitor 25. The power supply 31 and the coil 32 correspond to the power supply 3 and the primary winding 2a of the flyback transformer 2 in FIG. 11. The switch 33 corresponds to the parallel circuit of the NPN transistor 22 and the diode 23.

In this embodiment, the parallel circuit (the first parallel circuit) of the switch 33, the capacitor 24 and the series circuit of the horizontal deflection coil 7 and the capacitor 25 is connected to a parallel circuit (the second parallel circuit) of a switch 34, a capacitor 35 and a series circuit of a coil 36 and a capacitor 37. Also, this second parallel circuit is connected in parallel to a series circuit of a coil 38 and a power supply 39. In other words, this horizontal deflection circuit is formed by connecting the first parallel circuit to the second parallel circuit having the same construction as the first parallel circuit.

In order to correct the horizontal pin, it is necessary that the retrace pulse (the voltage $V_{24}$ across the capacitor 24), as shown in FIG. 15(a), supplied to the horizontal deflection coil 7, be adjusted in its level to be larger at substantially the central portion (at the central area of the screen) than at the left and right ends (at the upper and lower ends of the screen). The level of a retrace pulse resulting from the addition of this voltage $V_{24}$ and the voltage, $V_{35}$ across the capacitor 35 is constant as shown in FIG. 15(c) because it is specified by the power supply 31 and the width of the retrace pulse.

Thus, if the voltage $V_{35}$ is changed to decrease at the central portion (at the central region of the screen) and increase at the left and right ends (at the upper and lower ends of the screen) in association with the vertical deflection period as shown in FIG. 15(b), the voltage level $V_{24}$ can be adjusted to be larger at substantially the central portion (at the central region of the screen) than at the left and right ends (at the upper and lower ends of the screen).

In this example, the switch 34 is operated to switch in synchronism with the switch 33, so that the retrace pulse is generated at the junction between the capacitor 35 and the coil 38. In addition, the voltage from the power supply 39 is changed to decrease at the central portion (at the central region of the screen) and increase at the left and right ends (at the upper and lower ends of the screen) in association with the vertical deflection period as shown in FIG. 15(b). As a result, the level of voltage $V_{24}$, as shown in FIG. 15(a), is changed to be larger at substantially the central portion (at the central region of the screen) than at the left and right ends (at the upper and lower ends of the screen), so that the horizontal pin is corrected.

Other known horizontal pin correction systems are known as the power supply modulating system and the PCT system. The power supply modulating system modulates the voltage of the power supply 3 by the vertical deflection period as, for example, shown in FIG. 11. In the PCT system, as shown in FIG. 11, the transformer has its secondary winding connected in series with the horizontal deflection coil 7, and its primary winding supplied with a vertical deflection current.

In either of these systems, however, the voltage Vcp is modulated by the vertical deflection period, and hence the various voltages taken out of the transformer 2 are modulated by the vertical deflection period. Therefore, these systems can be applied to the so-called separate type circuit arrangement having the horizontal deflection circuit and the high voltage generating circuit separately provided, but cannot be used in the so-called conventional type circuit arrangement having both circuits combined into a single circuit.

The system shown in FIG. 14 can be used not only for the separate type arrangement but also for the conventional type horizontal deflection circuit. In FIG. 14, the various voltages derived from the secondary winding of the transformer, even with the coil 32 connected as its primary winding, are not modulated by the vertical deflection period.

Several significant problems exist with these known circuit arrangements. In the circuit arrangement shown in FIG. 14, it is necessary for current to flow not only in the second parallel circuit of the switch 34, the capacitor 35 and the series circuit of the coil 36 and the capacitor 37, but also in the series circuit of the coil 38 and the power supply 39, and thus the power consumption is relatively large. The present invention reduces horizontal pin distortion at a significantly reduced power consumption.

SUMMARY OF THE INVENTION

It is an object of the present invention to provide an improved deflection current generating circuit for use in a television or video monitor.

It is a feature that the present invention to provides improvement in horizontal pin distortion.

It is an advantage that the present invention also provides reduced current drain.

These and other objects, advantages and features of the invention will become apparent to those skilled in the art upon consideration of the following description of the invention.

In one embodiment of the present invention, a deflection current circuit having reduced power requirements is provided. A switch 33 is controlled by a control circuit 71 in association with the horizontal deflection period. A switch 73 is controlled by the control circuit 72 in synchronization with the horizontal deflection period modulated by the vertical deflection period. Switch 33 is turned off in the retrace interval, and during the period in which the switch 33 is in the off-state, the switch 73 is turned off for a predetermined period. The off-period of the switch 73 is modulated by the vertical deflection period to produce greater horizontal deflection in the center of the screen.

The deflection current generating circuit of the present invention has a switch 33 as a first switching element for performing a switching operation in association with the horizontal deflection period as described above. A coil 32 acts as a retrace pulse generating coil for generating a retrace pulse in association with the switching operation of the switch 33. A horizontal deflection coil 7 and capacitors 24, 25 form resonant circuits for resonating in association with the switching operation of the switch 33. A switch 73 serves as a second switching element and switches in association with both the horizontal deflection period and the vertical deflection period. A capacitor 74 serves as an "adjust pulse" generator acting in conjunction with the operation of the switch 73.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

Figure 1:
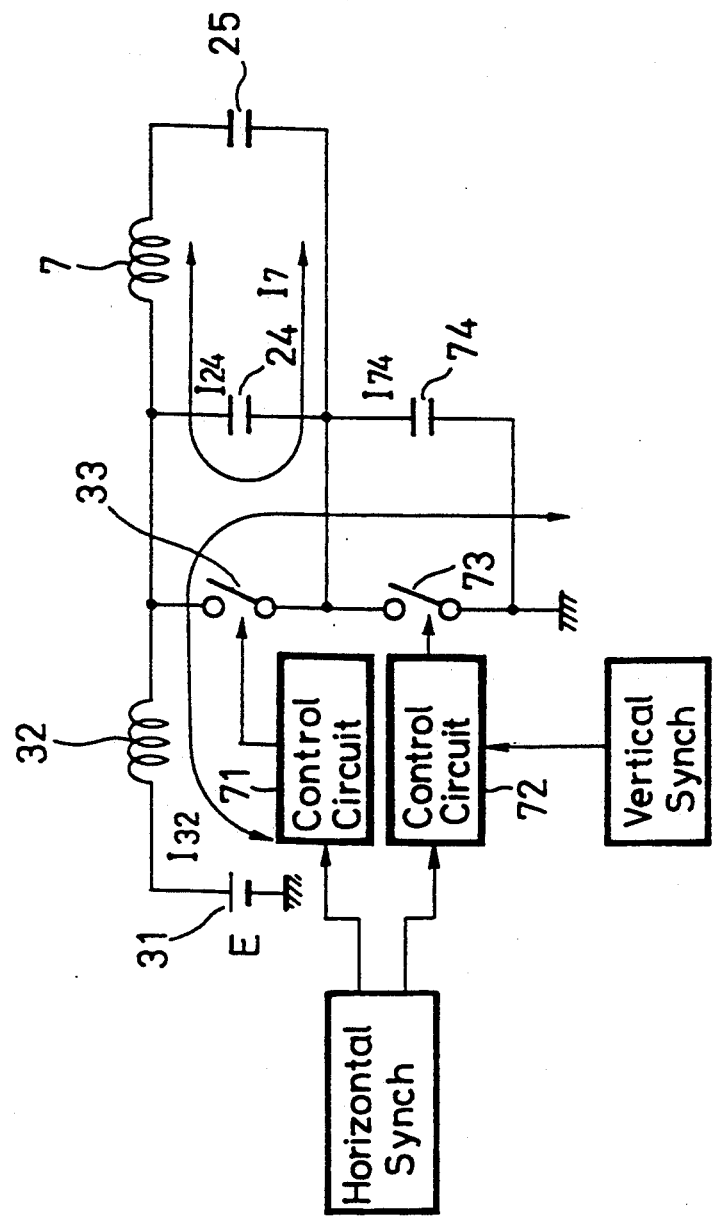
FIG. 1 is a circuit diagram of the construction of one embodiment of the deflection current generating circuit of the invention.

FIG. timing chart for the operation of the embodiment of FIG. 1.

Figure 3:
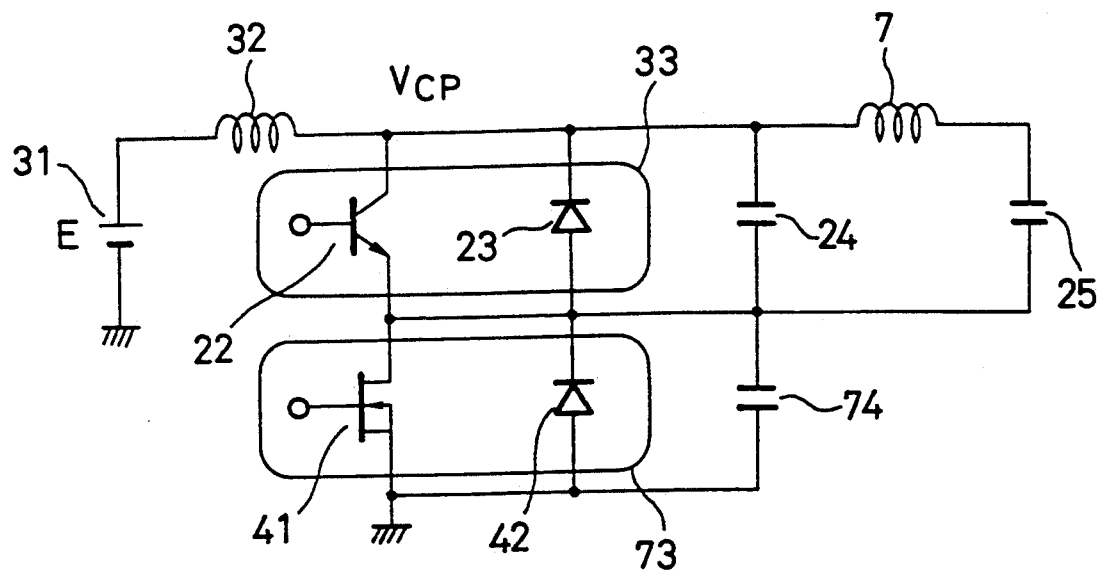

FIG. 3 is a circuit diagram of the construction of a second embodiment of the deflection current generating circuit of the invention.

Figure 4:
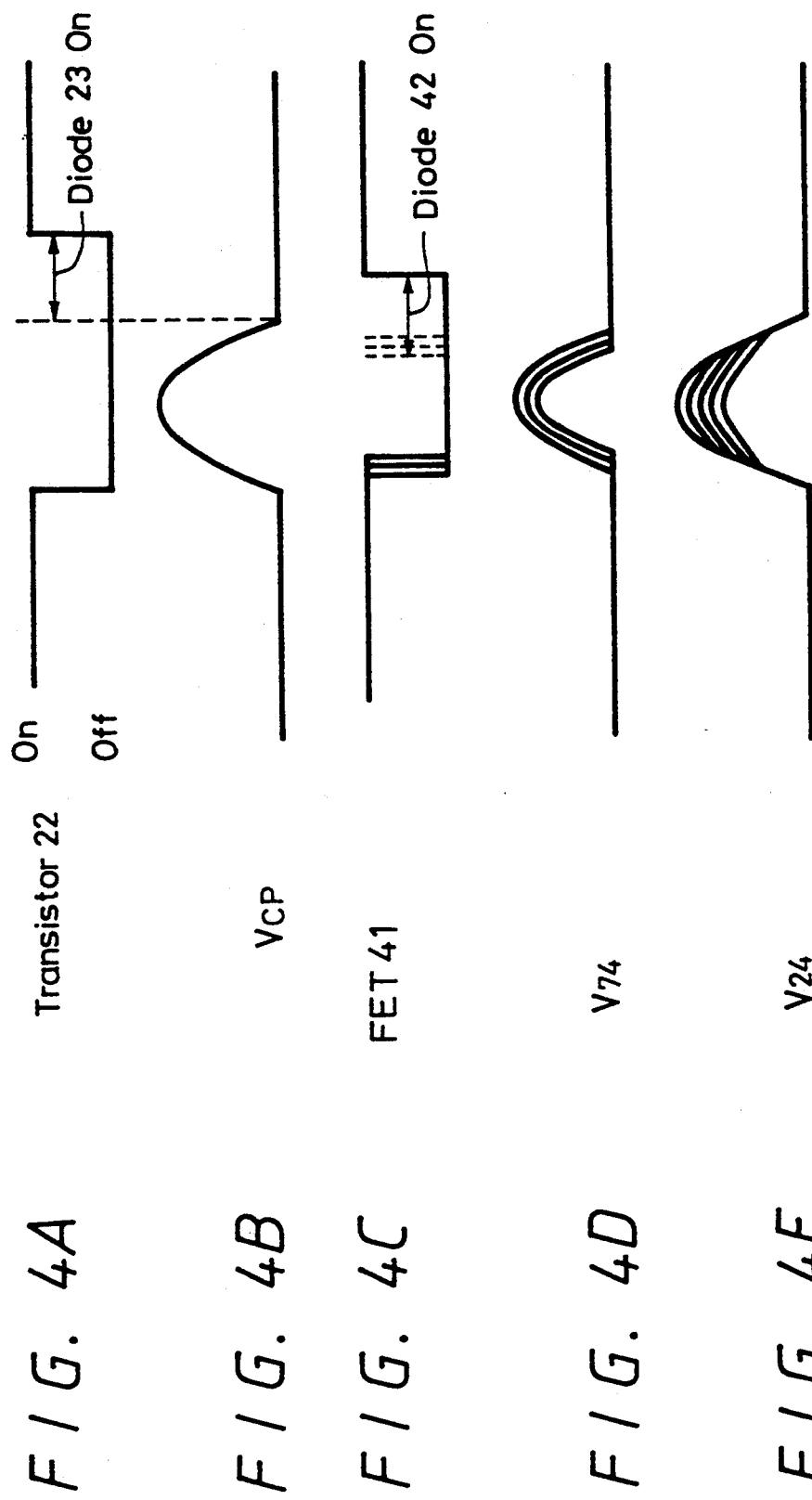

FIG. 4 is a timing chart for the embodiment of FIG. 3.

Figure 5:
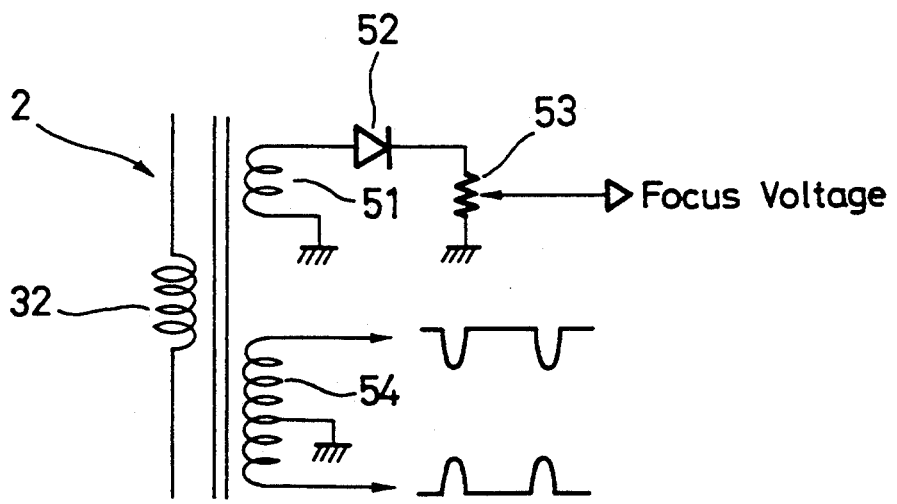

FIG. 5 is a circuit diagram of the construction of the transformer which can be used in the embodiments of FIGS. 1 and 3.

Figure 6:
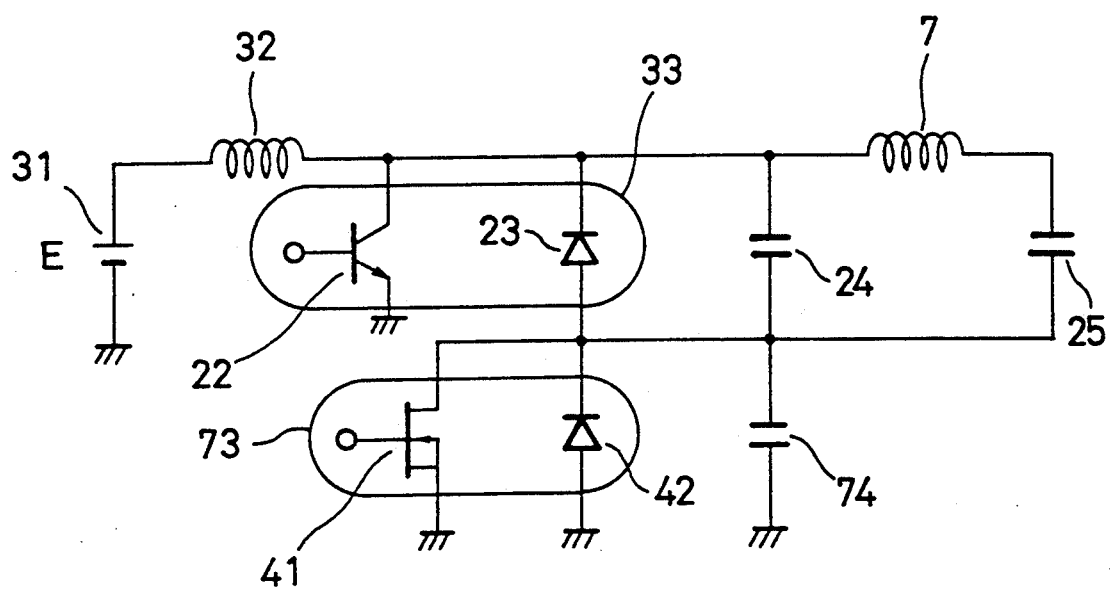

FIG. 6 is circuit diagram of the construction of a third embodiment of the deflection current generating circuit of the invention.

Figure 7:
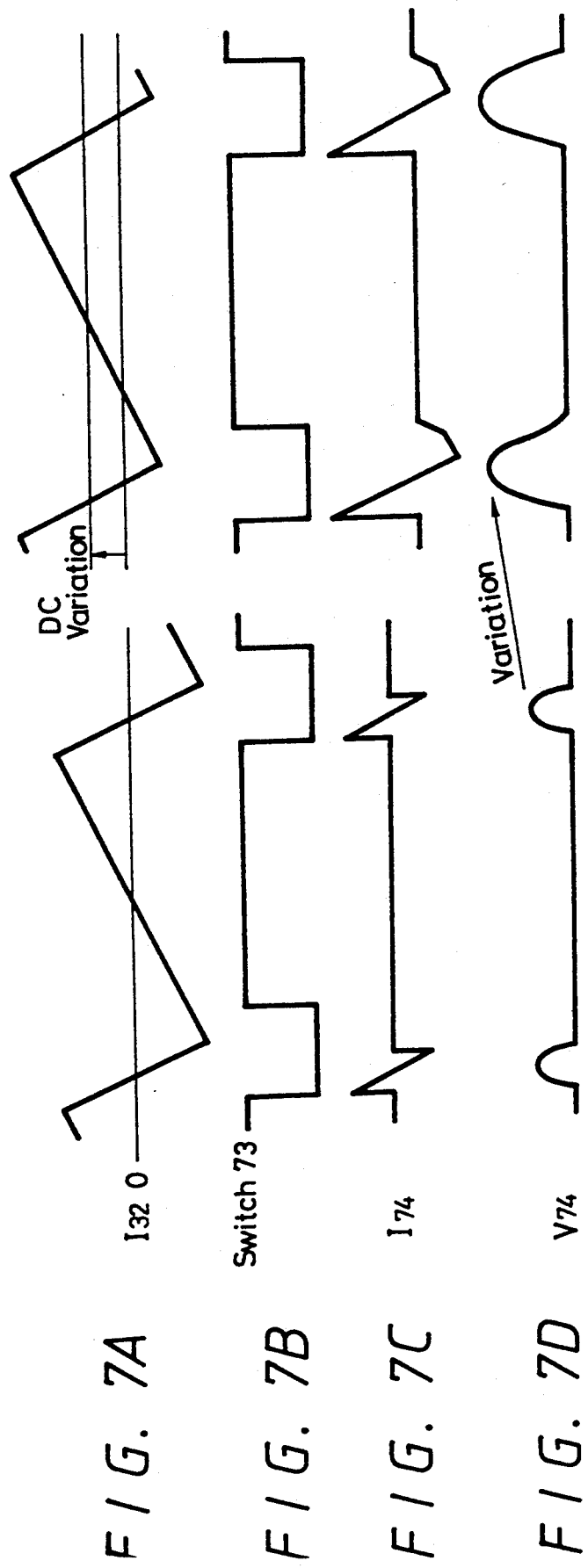

FIG. 7 is a timing chart for the operation in the case of change of DC component of the current $I_{32}$ in the embodiments of FIGS. 1, 3 and 6.

Figure 8:
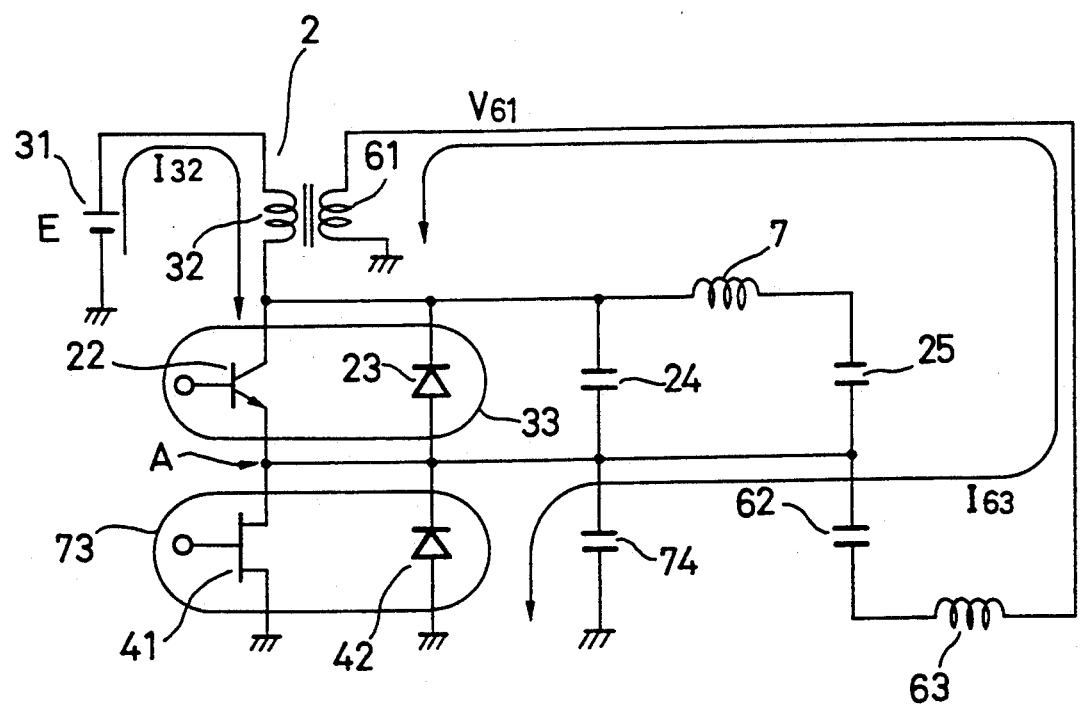

FIG. 8 is a circuit diagram of the construction of a fourth embodiment of the deflection current generating circuit of the invention.

Figure 9:
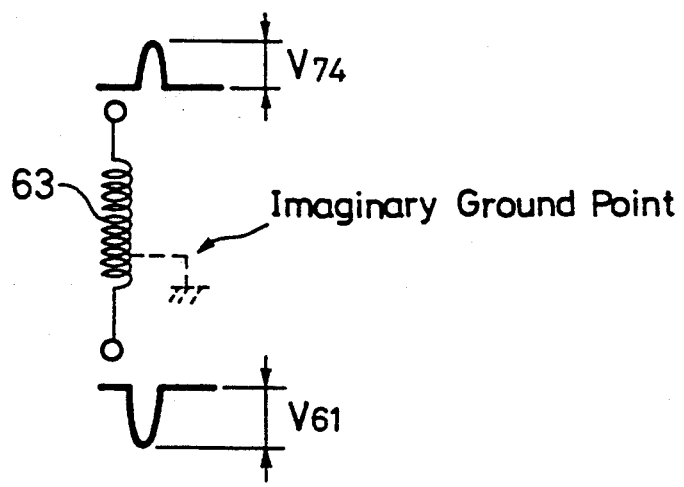

FIGURE 9 is a diagram for the operation of the coil 63 in the embodiment of FIG. 8.

Figure 10:
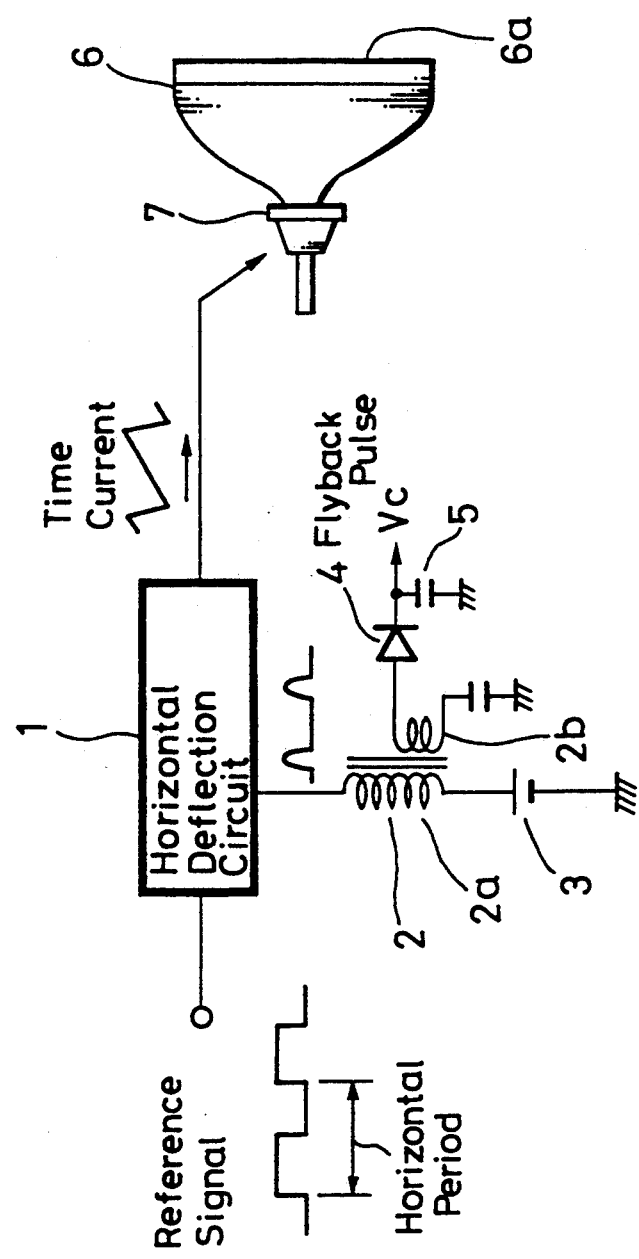

FIG. 10 is a block diagram of an example of the construction of the conventional horizontal deflection circuit.

Figure 11:
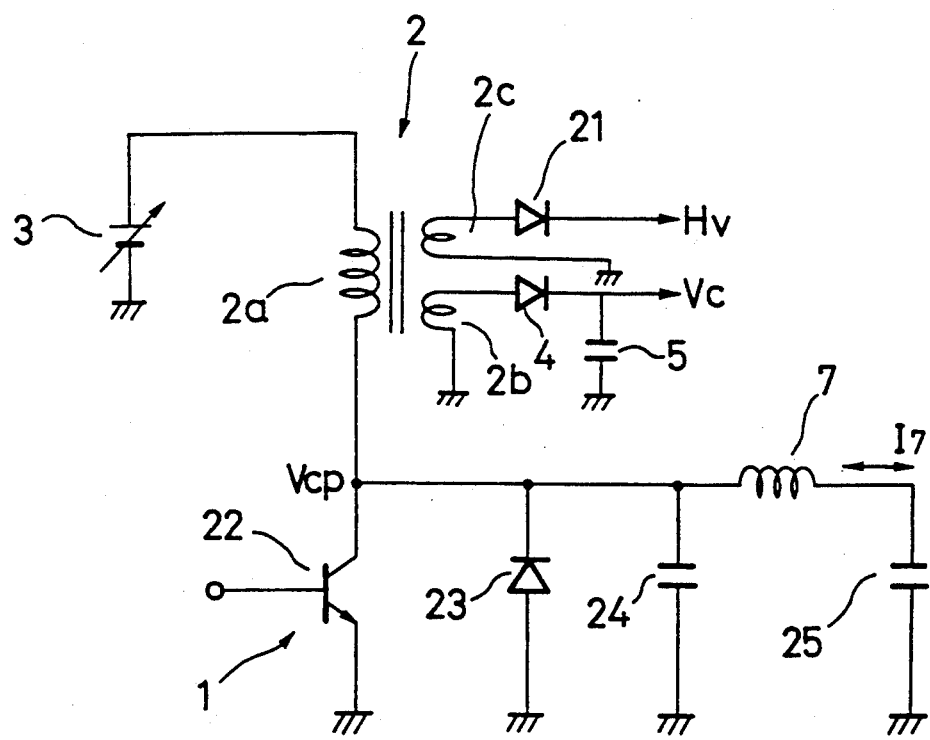

FIG. 11 is a circuit diagram of an example of the construction of the horizontal deflection circuit 1 in the example of FIG. 10.

Figures 12A, 12B:
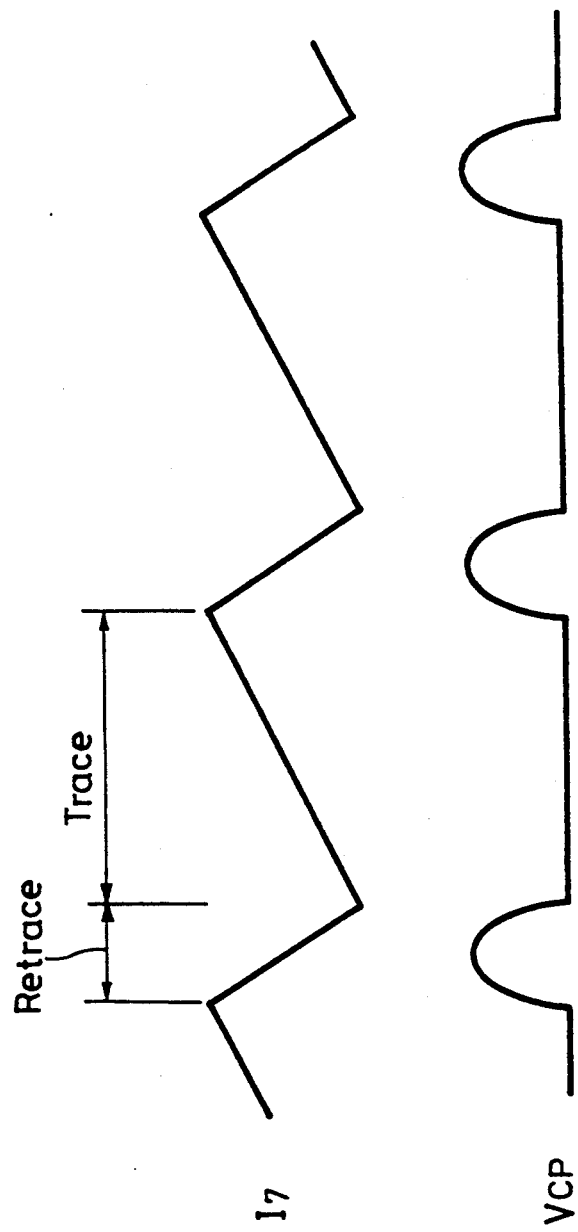

FIG. 12 is a timing chart for the operation of the construction of FIG. 11.

Figure 13A:
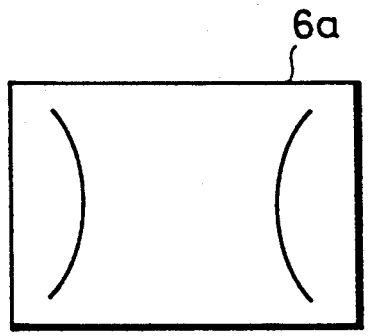
Figure 13B:
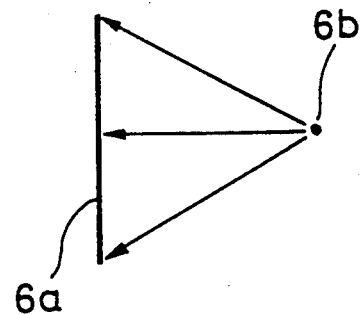

FIG. 13 is a diagram to which reference is made in explaining the principle of the generation of the horizontal pin in the example of FIG. 11.

Figure 14:
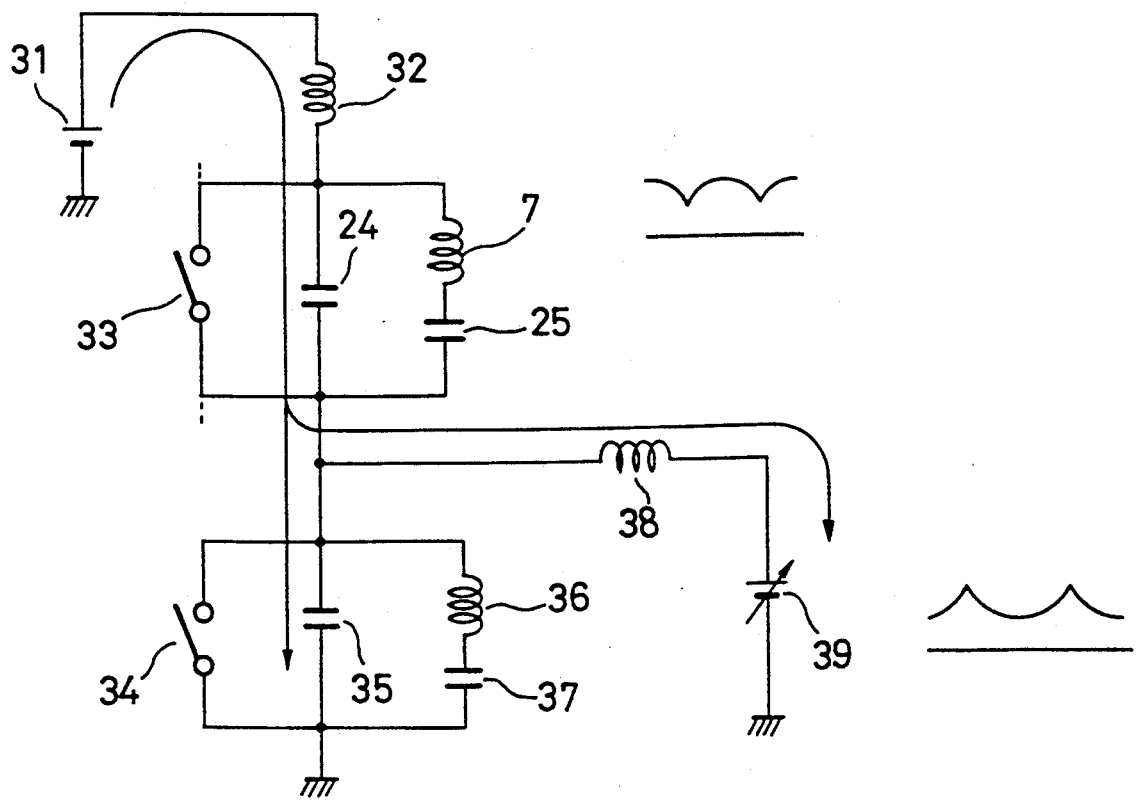

FIG. 14 is a circuit diagram of the construction of an example of the conventional deflection current generating circuit for correcting the horizontal pin.

FIG. 15 is a wave form diagram to which reference is made in explaining the operating of the example of FIG. 14.

DETAILED DESCRIPTION OF THE INVENTION

FIG. 1 is a circuit diagram of one embodiment of the deflection current generating circuit of the invention. Like elements corresponding to those in FIGS. 10, 11 and 14 are identified by the same reference numerals. In this embodiment, a parallel circuit of a switch 73 and a capacitor 74 is connected in a series with a parallel circuit of the switch 33, the capacitor 24 and a series circuit of the horizontal deflection coil 7 and the capacitor 25. The switch 33 is controlled by a control circuit 71 so as to switch in synchronization with the horizontal deflection period.

Figure 2:
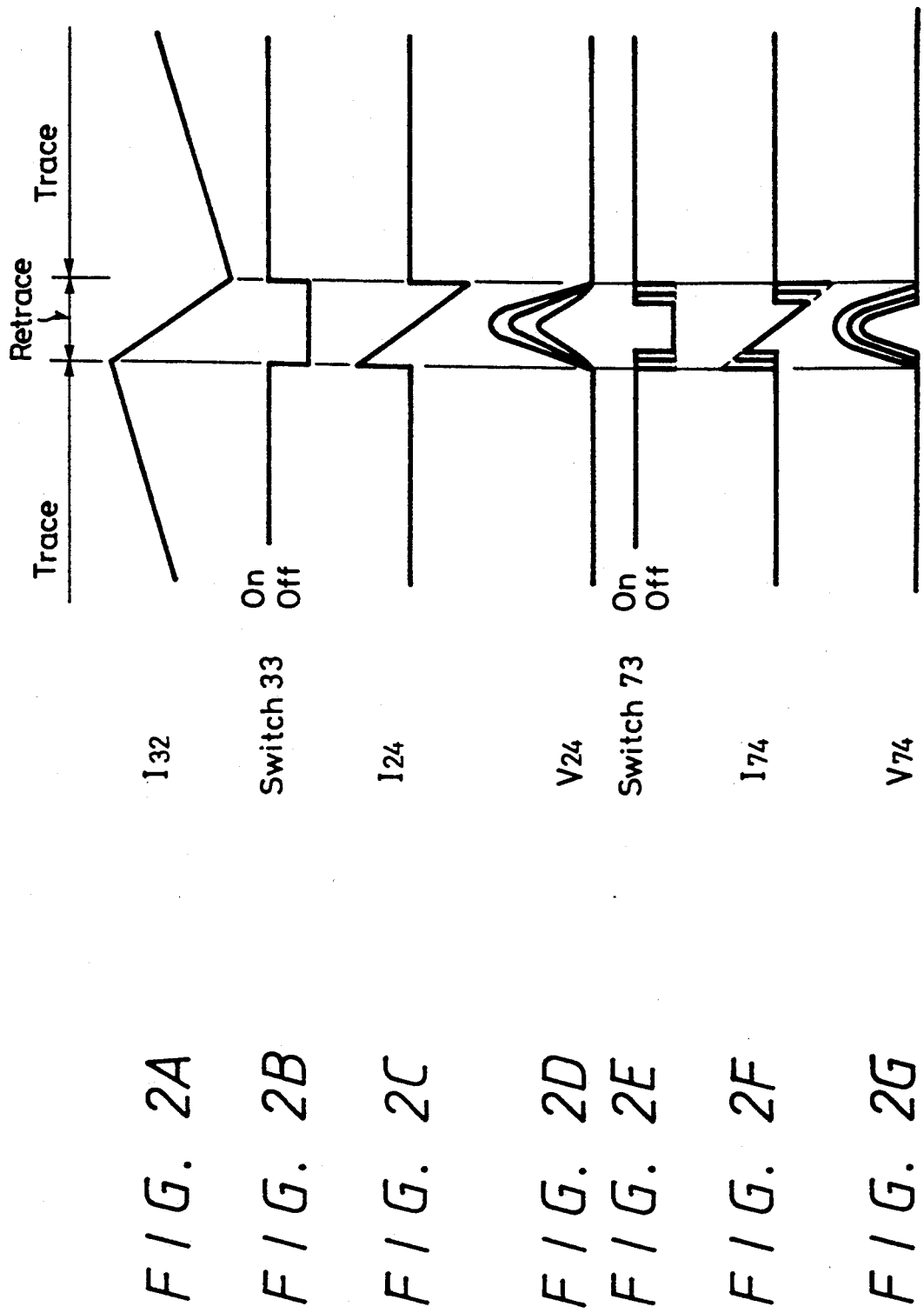

Referring briefly to FIG. 2, and in particular FIG. 2b, the switch 33 is switched off during the horizontal retrace period and is on otherwise. Switch 73 is also on during the trace period. Switch 73 is off during at least a portion of the retrace period. In order to provide the pin correction, the pulse width of the off time of switch 73 is modulated by the vertical period as will be explained later in greater detail.

FIG. 3 shows an embodiment of the invention of FIG. 1 in which diodes and transistors serve as the switches 33 and 73. The switches 33 and 73 are respectively implemented using the NPN transistor 22 and the diode 23, and the FET 41 and the diode 42 or an FET. The capacitor 74 is connected in parallel with the switch 73.

As illustrated in FIG. 2, the switches 33 and 73 are turned off in the retrace interval of the horizontal deflection interval, and turned on in the trace interval. The switch 73 is turned off during a predetermined portion of the period in which the switch 33 is in the off-state. The off-period of the switch 73 is modulated in accordance with the vertical deflection period so that the duration of time in which switch 73 is off varies depending upon the vertical deflection period. That is, the switch 73 is off for a shorter time period near the center of the vertical deflection period (center of the screen), and off for a longer time period near the beginning and end of the vertical deflection period (top and bottom of the screen). In other words, the pulse width of the off time for the switch 73 is modulated in accordance with the vertical deflection period so that the pulse width is shortest in the center of the vertical period and longest near the top and bottom of the trace. This causes current in the horizontal deflection coil to be greater near the center of the screen than at the upper and lower ends of the screen as required to correct horizontal pin.

When the off time of switch 33 and switch 73 are identical, no pin correction is introduced. The shorter the off time of switch 73 is made, the more pin correction is introduced. Thus the control signal for switch 73 can be a pulse width modulated horizontal synchronization pulse wherein the modulating signal has a period equal to the vertical deflection period.

In one embodiment, the control signal used to control switch 73 may use digital techniques to modulate the horizontal synchronization pulse by the vertical deflection period to achieve a pulse width modulated signal. Thus, the width of the pulse can be varied on a line by line basis in descrete increments on the basis of the line count. That is, the line count can be used to determine the width of the off time pulse of switch 73 and thus determine the amount of pin correction.

According to the deflection current generating circuit of the above construction, the switch 73 is caused to switch in synchronization with the horizontal deflection period as in FIG. 2e. This switching operation itself is modulated by the vertical deflection period so that an adjustment signal across capacitor 74 is adjusted in its level. Thus, the horizontal pin is corrected and the power consumption is reduced as compared with the case of adjusting the power supply voltage itself for setting the level of the adjust pulse.

The switch 33 is controlled by the control circuit 71 so that it is turned on during the trace interval for the horizontal deflection and turned off during the retrace interval (FIG. 2(b)). The saw-tooth wave current $I_{32}$ (FIG. 2(a)) flowing in the coil 32 flows through the switch 33 when the switch 33 is in the on-state, but flows through the capacitor 24 when the switch 33 is in the off-state. The switch 73 is controlled by the control circuit 72 so that it is turned off for a predetermined time during the retrace interval in which the switch 33 is in the off-state (FIG. 2(c)).

The current $I_{32}$ flows in the switches 33 and 73 when the switches 33 and 73 are in the on-state, but flows in the capacitors 24 and 74 when the switches 33 and 73 are in the off-state. When the switch 33 is in the off-state but the switch 73 is in the on-state, the current flows in the capacitor 24 and the switch 73. When the switch 33 is in the off-state, the saw-tooth wave current I, flows in the resonant circuit of the horizontal deflection coil 7 and capacitors 25 and 24.

The capacitance of the capacitor 24 is selected to be much smaller than that of the capacitor 74. Therefore, the retrace period (time) Tr is substantially determined by the capacitance values of the capacitors 24 and 25 and the inductance of the horizontal deflection coil 7. It is approximately the same when the capacitor 74 is connected as when this capacitor 74 is not connected since the series combination of capacitors 74 and 24 is only slightly less than the capacitance of capacitor 24. The voltage Vcp between the ground potential and the junction of the coil 32 and the horizontal deflection coil 7 is given by the following equation:

$$Vcp = E(1 + (\pi/2)(Tt/Tr)) \qquad (1)$$

This voltage Vcp is equal to the sum of the voltage $V_{24}$ across the capacitor 24 and the voltage $V_{74}$ across the capacitor 74. That is, the following equation is satisfied:

$$VCP = V_{24} + V_{74} \qquad (2)$$

The energy for deflection, when the capacitor 74 is not connected, is given as $(\frac{1}{2})C_{24}Vcp^2$ but, when the capacitor 74 is connected as shown in FIG. 1, it is given as $(\frac{1}{2})C_{24}V_{24}^2$. Since the $V_{24}$ is smaller than Vcp, the deflection current $I_7$ is smaller when the capacitor 74 is connected (that is when switch 73 is off) than when it is not connected (switch 73 is on). Thus, if the period in which the switch 73 is in the off-state (the period in which it is in the on-state) is modulated to vary the voltage $V_{74}$, the voltage $V_{24}$, and thus the deflection current $I_7$, can be adjusted. The result is that the raster size can be controlled. In addition, if the period in which the switch 73 is turned off is modulated by the vertical deflection period, the left and right pins can be corrected.

In the retrace interval in which the switch 33 is in the off-state, the resultant current $I_{24}$ (FIG. 2(c)) of the currents $I_{32}$ and $I_7$ flows in the capacitor 24. Since both the currents $I_{32}$ and $I_7$ are saw-tooth waves, the current, $I_{24}$ is as shown in FIG. 2(c)). If the switch 7 3 is turned on and off just in synchronism with the switch 33, the current $I_{32}$ flows through the switch 73 or capacitor 74 to the ground, and thus the $I_{74}$ equals to the current flowing in the capacitor 24 in the interval in which the switch 33 (or 73) is in the off-state.

Now consider that the off-timing (FIG. 2(c)) of the switch 73 is modulated so that the off-time pulse is narrower than the off-time pulse (FIG. 2(b)) of the switch 33. Then, in the interval in which the switch 33 is off and the switch 73 is on, the current $I_{32}$ flows in the switch 73, but in the interval in which both switches 33 and 73 are off, the current flows in the capacitors 24 and 74. Therefore, the current $I_{74}$ has a waveform (the waveform of current $I_{32}$ cut out) as indicated by the solid line in FIG. 2(f). In other words, the interval in which the current $I_{32}$ is cut out can be changed and adjusted by Vcp at the junction between the coil 32 and the horizontal deflection yoke 7 as shown in FIG. 4(b) is the sum of the voltage $V_{74}$ across the capacitor 74 shown in FIG. 4(d) and the voltage $V_{24}$ across the capacitor 24 shown in FIG. 4(c). Thus, if the off-timing of the FET 41 is adjusted in association with the vertical deflection period, the frequency (width) and height of the voltage $V_{74}$ developed across the capacitor 74 can be controlled. The increase of the frequency means that the width of the pulse shown in FIG. 4(d) is decreased, and the decrease of the frequency means that the width of the pulse is increased. If the pulse width is decreased, the pulse height is decreased, while if the width is increased, the pulse height is increased. As a result, the voltage Vcp (constant) minus the voltage $V_{74}$, or the voltage $V_{24}$ is changed as shown in FIG. 4(e).

Although only the off-period of the NPN transistor 22 and FET 41 is shown in FIG. 4, the on-periods of the diodes 23 and 42 coincide with when the voltage Vcp is 0 and when the voltage $V_{74}$ is 0, respectively. Therefore, when the NPN transistor 22 and the diode 23 are replaced by the single switch 33 and when the FET 41 and the diode 42 are replaced by the single switch 73, the operation is the same as in FIG. 2.

The coil 32 shown in FIGS. 1 and 3 can be the primary coil of the flyback transformer 2 as shown in FIG. 5. In this case, the transformer has secondary coils 51 and 54. The output of the secondary coil 51 is rectified by a diode 52, and divided by a resistor 53 to produce a focus voltage. The secondary coil 54 produces output pulses of opposite polarities.

FIG. 6 shows a third embodiment. In this embodiment, the emitter of the NPN transistor 22, which is also used in the embodiment shown in FIG. 3, is grounded. The other portions are the same as in FIG. 3. This arrangement operates in essentially the same manner as the embodiment of FIG. 3.

In the embodiments shown in FIGS. 1, 3 and 6, when the DC component of the current $I_{32}$ flowing in the coil 32 is changed as, for example, shown in FIG. 7(a), the current $I_{74}$ as shown in FIG. 7(c) flows in the capacitor 74 in accordance with the switching operation of the switch 73 shown in FIG. 7(b). In other words, in the DC component superimposed state (shown on the right hand of FIG. 7), the current $I_{74}$ is changed into a nonlinear shape, and the voltage $V_{74}$ across the capacitor 74 is changed as shown in FIG. 7(d). This means that when the current $I_{32}$ flowing in the coil 32 is changed, the raster size is changed. Thus, this invention can be applied to the so-called separate type circuit arrangement having the horizontal deflection circuit and the high voltage generating circuit separately provided, but cannot be applied to the conventional type circuit arrangement having both circuits combined.

FIG. 8 shows another embodiment which can be used for the conventional type circuit arrangement. In this embodiment, the transformer 2 has a first coil formed of the coil 32 and a secondary coil 61. The secondary coil 61 is connected through a series circuit of a coil 63 and a capacitor 62 to the junction between a capacitor 74 and the capacitor 25. The other portions are constructed in the same way as in the embodiments shown in FIGS. 1 and 3. That is, in this embodiment, a main resonant circuit formed of the horizontal deflection coil 7 and the capacitors 25 and 24 is connected with a sub-resonant circuit formed of the secondary coil 61, the coil 63, the capacitor 62 and the capacitor 74. The transformer 2 is the flyback transformer. The inductance of the secondary winding 61 of the flyback transformer should be made much larger than that of the coil 63 of the sub-resonant circuit.

According to this arrangement, during the first half of the retrace interval, current flows in the path of capacitor 74, capacitor 62, coil 63, and secondary coil 61 of transformer 2, while in the second half of the retrace interval, the current $I_{63}$ flows in the coil 63 through the path in the opposite direction.

In the trace interval, the resonant frequency of the main resonant circuit is specified by the inductance $L_7$ of the horizontal deflection coil 7 and the static capacitance $C_{25}$ of the capacitor 25. In the retrace interval, it is specified by the inductance $L_7$, the static capacitance $C_{25}$ and the static capacitance $C_{24}$ of the capacitor 24. In the trace interval, the frequency of the sub-resonant circuit is specified by the static capacitance $C_{62}$ of the capacitor 62 and the inductance $M_{63}$ (which will be described later) of the coil 63. In the retrace interval, it is specified by the inductance $M_{63}$, the static capacitance $C_{62}$ and the static capacitance $C_{74}$ of the capacitor 74 (see Table 1).

TABLE 1

|  | Trace Interval | Retrace Interval |
|---|---|---|
| Main resonant circuit | $L_7$, $C_{25}$ | $L_7$, $C_{25}$, $C_{24}$ |
| Sub-resonant circuit | $M_{63}$, $C_{62}$ | $M_{63}$, $C_{62}$, $C_{74}$ |

In the Main resonant circuit and the sub-resonant circuit, the frequency $f_T$ in the trace interval should be set to be much smaller in value than the frequency $f_R$ in the retrace interval. In other words, the trace interval of time should be a much longer value than the retrace interval of time. In order to realize this, the capacitance $C_{62}$ is selected to have a much larger value than the capacitance value $C_{74}$.

The frequencies $f_T$ and $f_R$ are given by the following equations:

$$f_T = 1/(2\pi (M_{63}C_{62})^{\frac{1}{2}}) \qquad (3)$$

$$f_R = 1/(2\pi (M_{63}C_\phi)^{\frac{1}{2}}) \qquad (4)$$

where $C_\phi$ is the combined series capacitance of the capacitors 62 and 74, and is expressed by the following equation:

$$C_\phi = C_{62}C_{74}/(C_{62}+C_{74}) \qquad (5)$$

$M_{63}$ is not the original inductance $L_{63}$ of the coil 63, but the equivalent inductance specified in accordance with the voltage developed thereacross.

In other words, as shown in FIG. 9, the voltage $V_{74}$ across the capacitor 74 and the output voltage $V_{61}$ induced in the secondary coil 61 of the transformer 2 are supplied to one terminal of the coil 63 and to the other terminal thereof, respectively. As a result, the inductance $M_{63}$ contributing to the resonant operation of the sub-resonant circuit is expressed by the following equation:

$$M_{63} = L_{63}V_{74}/(V_{74}+V_{61}) \qquad (6)$$

The imaginary ground point of the coil 63 is moved in accordance with the voltage values of the voltages $V_{74}$ and $V_{61}$.

Since $f_T$ is much smaller than $f_R$, the following inequality is satisfied.

$$1/(2\pi (M_{63}C_{62})^{\frac{1}{2}}) << 1/(2\pi (M_{63}C_\phi)^{\frac{1}{2}}) \quad (7)$$

The following inequality can be derived from the above inequality.

$$M_{63}C_{62} >> M_{63}C_\phi \quad (8)$$

Rearranging the above inequality will yield the following inequality.

$$C_{62} >> C_\phi \quad (9)$$

Where if $C_{62} >> C_{74}$, the value of $C_\phi$ is approximated by $C_{74}$, and thus the above is satisfied.

Since the frequency is determined by the product of $M_{63}(L_{63})$ and $C_{74}$, the $M_{63}(L_{63})$ should be selected to be much larger than $C_{74}$.

Since the coil 61 serves to supply a predetermined bias to the capacitor 74 through the coil 63 and the capacitor 62, the current flowing from the coil 63 to the secondary coil 61 of the transformer 2 should be prevented from greatly affecting the transformer 2. Thus, the inductance $L_{61}$ of the secondary coil 61 should be set to be much larger than the inductance value $L_{63}$ of the coil 63.

If the current $I_{63}$ flows as a bias from the secondary coil 61 of the transformer 2 through the coil 63 and the capacitor 62 to the capacitor 74, the resultant current of $I_{32}$ and $I_{63}$ flows in the capacitor 74 in the stationary state. Thus, if the current $I_{63}$ is set to be much larger than current $I_{32}$, the amount of change of current flowing in the capacitor 74 is relatively small even though the current $I_{32}$ is changed with the change of the applied high voltage in the secondary winding of the transformer 2. Therefore, a flyback transformer can be used for the transformer 2, and thus this circuit arrangement can be applied to the so-called conventional type circuit arrangement.

The capacitor 62 in FIG. 8 can be connected between the capacitor 25 and the capacitor 74 so as to be common to the main resonant circuit and the sub-resonant circuit. The emitter of the NPN transistor 22 can be grounded as in FIG. 6.

While in the above embodiment the switch 33 is implemented using the NPN transistor 22 and the diode 23 and the switch 73 is formed of the FET 41 and the diode 42, the switch 33 may be formed of an FET and a diode, and the switch 73 may be formed of a transistor and a diode. Also, both the switches 33 and 73 can be formed of a transistor and a diode, or of an FET and a diode. When an FET is used, the parasitic diode can be substituted for the discrete diode. In general, use of an FET makes the circuit simpler, and the switching speed higher, than use of a transistor. Other switch arrangements will occur to those skilled in the art.

Since the second switching element is not only switched in association with the horizontal deflection period, but also modulated with the vertical deflection period, the horizontal pin can be corrected. Moreover, since the level of the adjust pulse is adjusted by controlling the switching itself without adjusting the power supply voltage, the power consumption can be reduced.

In addition, since the second switching element performs a complete switching operation, the loss is small.

Since the switching is performed within the retrace interval, noise is suppressed from being visible. The DC or AC controllable range (dynamic range) of the horizontal deflection current can be widened. Since the height of the flyback pulse is not changed by AC control of the horizontal deflection current, this pulse makes it possible to stably produce various voltages.

The retrace pulse generation coil can be formed of a transformer, and in this case the output of the secondary winding of the transformer can be supplied to the adjust pulse generation circuit. Thus, this circuit arrangement can be used in the horizontal deflection circuit of the conventional type.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A deflection current generating circuit, comprising:
   a first switching element for switching in synchronization with a horizontal deflection period;
   a retrace pulse generating coil for generating a retrace pulse in association with the switching operation of said first switching element;
   a resonant circuit for resonating in association with the switching operation of said first switching element;
   a second switching element for switching in synchronization with both the horizontal deflection period and a vertical deflection period;
   an adjust pulse generating circuit, which is connected to said resonant circuit, for generating an adjust pulse in association with the switching operation of said second switching element;
   a transformer which has a primary winding and a secondary winding, and wherein said primary winding includes said retrace pulse generating coil; and
   a sub-resonant circuit connected between said secondary winding of said transformer and said adjust pulse generating circuit.

2. A deflection current generating circuit according to claim 1, wherein said sub-resonant circuit includes a coil and a capacitor which resonate in association with the switching operation of said second switching element.

3. A deflection current generating circuit according to claim 2, wherein said transformer is a flyback transformer having at least one secondary winding for generating a high voltage.

4. A deflection current generating circuit according to claim 3, wherein said sub-resonant circuit includes a coil; and wherein said secondary winding of said flyback transformer has a value of inductance which is much greater than an inductance of said coil of said sub-resonant circuit.

* * * * *